US012380902B2

(12) United States Patent
Ciolek et al.

(10) Patent No.: US 12,380,902 B2
(45) Date of Patent: Aug. 5, 2025

(54) VECTOR QUANTIZER CORRECTION FOR AUDIO CODEC SYSTEM

(71) Applicant: Cisco Technology, Inc., San Jose, CA (US)

(72) Inventors: Marcin Ciolek, Gdansk (PL); Michal Sulewski, Gdańsk (PL); Raul A. Casas, Doylestown, PA (US); Samer Lutfi Hijazi, San Jose, CA (US); Mihailo Kolundzija, Lausanne (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/540,060

(22) Filed: Dec. 14, 2023

(65) Prior Publication Data

US 2025/0131931 A1 Apr. 24, 2025

Related U.S. Application Data

(60) Provisional application No. 63/591,249, filed on Oct. 18, 2023.

(51) Int. Cl.

| | |
|---|---|
| ***G10L 19/038*** | (2013.01) |
| *G10L 19/00* | (2013.01) |
| *G10L 19/005* | (2013.01) |

(52) U.S. Cl.

CPC ............ *G10L 19/038* (2013.01); *G10L 19/00* (2013.01); *G10L 19/005* (2013.01)

(58) Field of Classification Search

CPC ...... G10L 19/00; G10L 19/038; G10L 19/005

See application file for complete search history.

(56) References Cited

U.S. PATENT DOCUMENTS

| | | | |
|---|---|---|---|
| 10,991,379 | B2 | 4/2021 | Hijazi et al. |
| 11,682,400 | B1 | 6/2023 | Liu et al. |

(Continued)

FOREIGN PATENT DOCUMENTS

| | | | |
|---|---|---|---|
| WO | 2010040522 | A2 | 4/2010 |
| WO | WO-2019213021 | A1 * | 11/2019 |
| WO | 2023177803 | A1 | 9/2023 |

OTHER PUBLICATIONS

Buhmann, et al., "Vector Quantization with Complexity Costs," IEEE Trans. Information Theory, Jul. 1993. (Year: 1993).*

(Continued)

*Primary Examiner* — Feng-Tzer Tzeng

(74) *Attorney, Agent, or Firm* — Edell, Shapiro & Finnan, LLC

(57) ABSTRACT

A method comprises: vector quantizing input vectors representative of audio into an original sequence including indices of codewords of a codebook; generating candidate sequences including the indices of the codewords of the codebook by evaluating, for each candidate sequence, transition costs for transitions between the indices based on (i) transition probabilities of the transitions, and (ii) distances between the codewords represented by the indices and the input vectors that corresponds to the indices; determining a preferred candidate sequence of the candidate sequences to replace the original sequence based on the transition costs for each candidate sequence; and transmitting the preferred candidate sequence in place of the original sequence.

20 Claims, 6 Drawing Sheets

(56) References Cited

U.S. PATENT DOCUMENTS

| | | | | |
|---|---|---|---|---|
| 11,901,976 | B2 * | 2/2024 | Mielczarek | H04B 7/063 |
| 2004/0102972 | A1 | 5/2004 | Droppo et al. | |
| 2007/0279261 | A1 | 12/2007 | Todorov et al. | |
| 2011/0029317 | A1 | 2/2011 | Chen et al. | |
| 2014/0191888 | A1 | 7/2014 | Klejsa et al. | |
| 2015/0095035 | A1 | 4/2015 | Shechtman | |
| 2015/0213809 | A1 * | 7/2015 | Peters | H04S 3/002 704/500 |
| 2016/0148618 | A1 | 5/2016 | Huang et al. | |
| 2017/0078010 | A1 * | 3/2017 | Suh | H04B 7/0619 |
| 2018/0308497 | A1 | 10/2018 | Chau et al. | |
| 2020/0186164 | A1 | 6/2020 | Marpe et al. | |
| 2020/0219519 | A1 | 7/2020 | Wang | |
| 2020/0234720 | A1 | 7/2020 | Sung et al. | |
| 2021/0125622 | A1 | 4/2021 | Zhao | |
| 2021/0256961 | A1 | 8/2021 | Garman et al. | |
| 2023/0019128 | A1 | 1/2023 | Zeghidour et al. | |
| 2023/0148275 | A1 | 5/2023 | Kim et al. | |
| 2023/0186927 | A1 * | 6/2023 | Zeghidour | G06N 3/045 704/500 |
| 2023/0238011 | A1 | 7/2023 | Mllemoes et al. | |
| 2023/0260524 | A1 | 8/2023 | Multrus et al. | |

OTHER PUBLICATIONS

Buhmann, et al., "Vector Quantization with Complexity Costs," IEEE Trans. Information Theory, 1993 (see attached reference in the previous Office action). (Year: 1993).*

Valin, J.M., et al., "LPCNET: Improving Neural Speech Synthesis Through Linear Prediction," https://arxiv.org/abs/1810.11846, Feb. 19, 2019, 5 pages.

Jiang, X., et al., "Latent-Domain Predictive Neural Speech Coding," https://arxiv.org/pdf/2207.08363.pdf, May 22, 2023, 12 pages.

Zeghidour, N., et al., "SoundStream: An End-to-End Neural Audio Codec," https://arxiv.org/pdf/2107.03312.pdf, IEEE/ACM Transactions on Audio, Speech, and Language Processing Jul. 7, 2021, 12 pages.

Défossez, A., et al., "High Fidelity Neural Audio Compression," https://export.arxiv.org/abs/2210.13438, Oct. 24, 2022, 19 pages.

Dietz, M., et al., "Overview of the EVS codec architecture," https://ieeexplore.ieee.org/document/7179063/, 2015 IEEE International Conference on Acoustics, Speech and Signal Processing (ICASSP), Apr. 2015, 5 pages.

Valin, J.M., et al., "Definition of the Opus Audio Codec," RFC 6716, https://datatracker.ietf.org/doc/html/rfc6716, Sep. 2012, 326 pages.

Mermelstein, P., "G.722: a new CCITT coding standard for digital transmission of wideband audio signals," IEEE Communications Magazine, vol. 26, No. 1, https://ieeexplore.ieee.org/document/417, Jan. 1988, pp. 8-15.

Oord, A. v.d., et al., "WaveNet: A Generative Model for Raw Audio," https://arxiv.org/abs/1609.03499, Sep. 19, 2016, 15 pages.

Kleijn, W.B., et al. "Wavenet Based Low Rate Speech Coding," 2018 IEEE international conference on acoustics, speech and signal processing (ICASSP), https://arxiv.org/abs/1712.01120, Dec. 2017, 5 pages.

Gray, R., "Vector quantization," https://ieeexplore.ieee.org/document/1162229, Abstract, Apr. 1984, 4 pages.

Valin, J.M., et al., "Low-Bitrate Redundancy Coding of Speech Using a Rate-Distortion-Optimized Variational Autoencoder," ICASSP 2023-2023 IEEE International Conference on Acoustics, Speech and Signal Processing (ICASSP), https://arxiv.org/abs/2212.04453, Feb. 24, 2023, 5 pages.

Bengio, Y., et al., "Estimating or Propagating Gradients Through Stochastic Neurons for Conditional Computation," https://arxiv.org/abs/1308.3432, Aug. 15, 2013, 12 pages.

Oord, A. v.d., et al., "Neural Discrete Representation Learning," Advances in neural information processing systems, vol. 30, https://arxiv.org/abs/1711.00937, May 30, 2018, 11 pages.

Jang, E., et al., "Categorical Reparameterization with Gumbel-Softmax," https://arxiv.org/abs/1611.01144, Aug. 5, 2017, 13 pages.

Liu, D., et al., "Discrete-Valued Neural Communication," https://arxiv.org/abs/2107.02367, Advances in Neural Information Processing Systems, vol. 34, Jul. 10, 2021, pp. 2109-2121.

Vaswani, A., et al., "Attention Is All You Need," 31st Conference on Neural Information Processing Systems (NIPS 2017), https://arxiv.org/abs/1706.03762, Dec. 2017, 15 pages.

Vasuki, A., et al., "A review of vector quantization techniques," https://ieeexplore-dev.ieee.org/document/1664069, Abstract, Jul. 31, 2006, 4 pages.

Choi, H.-S., et al., "Phase-aware Speech Enhancement with Deep Complex U-Net," International Conference on Learning Representations, https://arxiv.org/abs/1903.03107, Mar. 7, 2019, 20 pages.

Salimans, T., et al., "Improved Techniques for Training GANs," Advances in neural information processing systems, vol. 29, https://arxiv.org/abs/1606.03498, Jun. 10, 2016, 10 pages.

Kumar, K., et al., "MelGAN: Generative Adversarial Networks for Conditional Waveform Synthesis," https://arxiv.org/abs/1910.06711, Advances in neural information processing systems, vol. 32, Dec. 9, 2019, 14 pages.

Salimans, T., et al., "Weight Normalization: A Simple Reparameterization to Accelerate Training of Deep Neural Networks," Advances in neural information processing systems, vol. 29, https://arxiv.org/abs/1602.07868, Jun. 4, 2016, 11 pages.

Habets, E.A.P., "Room Impulse Response Generator," https://www.researchgate.net/publication/259991276_Room_Impulse_Response_Generator, Sep. 20, 2010, 21 pages.

Grondin, F., et al., "BIRD: Big Impulse Response Dataset," https://arxiv.org/abs/2010.09930, Oct. 19, 2020, 5 pages.

Liu, L., et al., "On the Variance of the Adaptive Learning Rate and Beyond," https://arxiv.org/abs/1908.03265, Oct. 26, 2021, 14 pages.

The ITU Radiocommunication Assembly, "Method for the subjective assessment of intermediate quality level of coding systems," retrieved from https://www.itu.int/rec/R-REC-BS.1534-1-200301-S/en, Dec. 12, 2023, 18 pages.

International Telecommunication Union, P. 863, "Perceptual Objective Listening Quality Assessment," P.863 : Perceptual objective listening quality assessment (itu.int), Jan. 2011, 76 pages.

Hines, A., et al., "ViSQOL: an objective speech quality model," EURASIP Journal on Audio, Speech, and Music Processing, https://asmp-eurasipjournals.springeropen.com/articles/10.1186/s13636-015-0054-9, May 17, 2015, 18 pages.

Lin, J., et al., "A Time-Domain Convolutional Recurrent Network for Packet Loss Concealment," Abstract, https://ieeexplore.ieee.org/document/9413595, Jun. 2021, 4 pages.

Pascual, S., et al., "Adversarial Auto-Encoding for Packet Loss Concealment," 2021 IEEE Workshop on Applications of Signal Processing to Audio and Acoustics (WASPAA), https://www.semanticscholar.org/reader/935c9e7a6d974707330fd40a3bdb279f4c0863a9, Jul. 8, 2021, pp. 71-75.

Mohamed, M., et al., "ConcealNet: An End-to-end Neural Network for Packet Loss Concealment in Deep Speech Emotion Recognition," https://arxiv.org/abs/2005.07777, May 15, 2020, 5 pages.

Lecomte, J., et al., "Packet-loss concealment technology advances in EVS," 2015 IEEE International Conference on Acoustics, Speech and Signal Processing (ICASSP), https://www.semanticscholar.org/paper/Packet-loss-concealment-technology-advances-in-EVS-Lecomte-Vaillancourt/b74f725cd349caf3505092157cc43aefd1811b4c, Apr. 2015, pp. 5708-5712.

Kazakos, E., et al., "Slow-Fast Auditory Streams for Audio Recognition," https://arxiv.org/pdf/2103.03516.pdf, Mar. 5, 2021, 7 pages.

Li, B., et al., "TranSFormer: Slow-Fast Transformer for Machine Translation," https://arxiv.org/abs/2305.16982, May 26, 2023, 12 pages.

Mujika, A., et al., "Fast-Slow Recurrent Neural Networks," https://arxiv.org/pdf/1705.08639.pdf, Jun. 9, 2017, 10 pages.

Ba, J., et al., "Using Fast Weights to Attend to the Recent Past," https://arxiv.org/abs/1610.06258, Dec. 5, 2016, 10 pages.

(56) References Cited

OTHER PUBLICATIONS

Tjandra, A., et al., "Unsupervised Learning of Disentangled Speech Content and Style Representation," https://arxiv.org/pdf/2010.12973.pdf, Jun. 20, 2021, 5 pages.
An, X., et al., "Disentangling Style and Speaker Attributes for TTS Style Transfer," https://arxiv.org/pdf/2201.09472.pdf, Jan. 24, 2022, 13 pages.
Yuan, S., et al., "Improving Zero-Shot Voice Style Transfer via Disentangled Representation Learning," https://openreview.net/pdf?id=TgSVWXw22FQ, Jan. 2021, 12 pages.
Perkins, C., et al., "RTP Payload for Redundant Audio Data," RFC 2198, https://dl.acm.org/doi/10.17487/RFC2198, Sep. 1997, 11 pages.
Valin, J.M., et al., "A Real-Time Wideband Neural Vocoder at 1.6 kb/s Using LPCNet," Proc. Interspeech 2019, https://arxiv.org/abs/1903.12087, Jun. 2019, pp. 3406-3410.
Jiang, X., et al., "End-to-End Neural Speech Coding for Real-Time Communications," 2022 IEEE International Conference on Acoustics, Speech and Signal Processing (ICASSP), https://ieeexplore.ieee.org/document/9746296, Feb. 15, 2022, pp. 866-870.
Schulzrinne, H., et al., "RTP: A Transport Protocol for Real-Time Applications," RFC 3550, https://www.rfc-editor.org/rfc/rfc3550, Jul. 2003, 104 pages.
Panayotov, V., et al., "Librispeech: An ASR corpus based on public domain audio books," 2015 IEEE International Conference on Acoustics, Speech and Signal Processing (ICASSP), https://ieeexplore.ieee.org/document/7178964, Apr. 2015, pp. 5206-5210.
Diener, L., et al., "INTERSPEECH 2022 Audio Deep Packet Loss Concealment Challenge," https://arxiv.org/abs/2204.05222, Apr. 11, 2022, 5 pages.
Diener, L., et al., "PLCMOS—a data-driven non-intrusive metric for the evaluation of packet loss concealment algorithms," https://arxiv.org/abs/2305.15127, May 24, 2023, 5 pages.
Gray, R., "Vector quantization," https://ieeexplore.ieee.org/document/1162229, IEEE ASSP Magazine, Apr. 1984, 26 pages.
Vasuki, A., et al., "A review of vector quantization techniques," https://ieeexplore-dev.ieee.org/document/1664069, IEEE Potentials, Jul. 2006, 9 pages.
Lin, J., et al., "A Time-Domain Convolutional Recurrent Network for Packet Loss Concealment," https://ieeexplore.ieee.org/document/9413595, ICASSP, Jun. 2021, 5 pages.
Zeghidour N., et al., "SoundStream: An End-to-End Neural Audio Codec", IEEE/ACM Transactions on Audio, Speech, and Language Processing, vol. 30, Published on Nov. 23, 2021, pp. 495-507.
Lincoln B., "An Experimental High Fidelity Perceptual Audio Coder", Music 420 Project, Stanford University., Mar. 1998, Retrieved from https://ccrma.stanford.edu/~jos/bosse/bosse.pdf, pp. 1-18.
Mentzer F., et al., "Conditional Probability Models for Deep Image Compression", Computer Vision and Pattern Recognition, Jun. 4, 2018, Retrieved from https://openaccess.thecvf.com/content_cvpr_2018/papers/Mentzer_Conditional_Probability_Models_CVPR_2018_paper.pdf, pp. 4394-4402.

* cited by examiner

600

VECTOR QUANTIZER CORRECTION FOR AUDIO CODEC SYSTEM

PRIORITY CLAIM

This application claims priority to U.S. Provisional Application No. 63/591,249, filed Oct. 18, 2023, which is incorporated herein by reference in its entirety.

TECHNICAL FIELD

The present disclosure relates generally to improving vector quantization.

BACKGROUND

A neural-based audio encoder and vector quantizer learn during a data driven training process. Post training, the audio encoder encodes input audio into vectors. In turn, the vector quantizer quantizes the vectors into indices of codewords of a codebook for transmission to a vector de-quantizer and audio decoder. The vector quantizer assigns the vectors to indices/index clusters based on a distance computation to centroids of the clusters. Sometimes, the vector quantizer assigns "outlier" indices (referred to as "outliers") that are improbable and not correct. The outliers cause audio distortion at the output of audio decoder, which a listener perceives as degraded audio.

DETAILED DESCRIPTION

Overview

In an embodiment, a method comprises: vector quantizing input vectors representative of audio into an original sequence including original indices of codewords of a codebook; generating candidate sequences including the indices of the codewords of the codebook by evaluating, for each candidate sequence, transition costs for transitions between the indices based on (i) transition probabilities of the transitions, and (ii) distances between the codewords represented by the indices and the input vectors that corresponds to the indices; determining a preferred candidate sequence of the candidate sequences to replace the original sequence based on the transition costs for each candidate sequence; and transmitting the preferred candidate sequence in place of the original sequence.

Example Embodiments

Neural Audio Codec System

Figure 1:
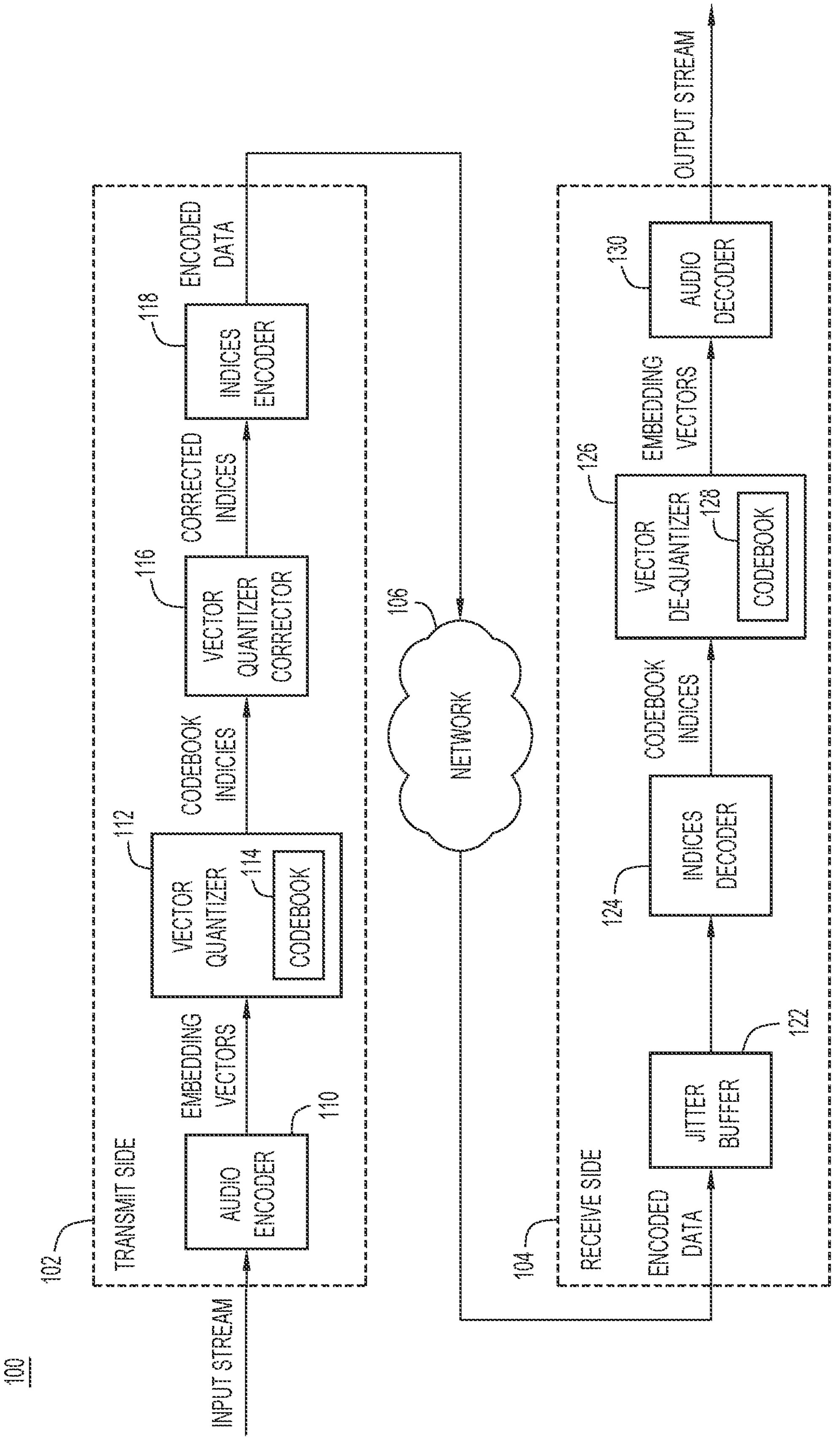
FIG. 1 shows a block diagram of a neural audio encoder/decoder (codec) system that is trained to perform audio processing, according to an example embodiment.

FIG. 1 is a block diagram of a neural audio encoder/decoder (codec) system 100 configured to perform audio processing described herein. The term "neural" is used to indicate that the system may be trained using neural networks (machine learning) techniques. A method of training neural audio codec system 100 is described below in connection with FIG. 2. Neural audio codec system 100 includes a transmit side 102 and a receive side 104, which may be separate at devices that are in communication with each other via network 106. Network 106 may be a combination of (wired or wireless) local area networks, (wired or wireless) wide area networks, public switched telephone network (PSTN), etc.

Transmit side 102 includes an audio encoder 110, a vector quantizer 112 that employs a codebook 114, a vector quantizer corrector 116 that operates according to embodiments presented herein, and an indices encoder 118. During inference stage operation (i.e., post training), audio encoder 110 receives an input audio stream (that includes speech as well as artifacts and impairments). Audio encoder 110 may use a deep neural network (DNN) that takes the input audio stream and transforms it, frame-by-frame, into high-dimensional embedding vectors that retain all the important information, and optionally removes unwanted information such as the artifacts and impairments. The embedding vectors are representative of the input audio stream. The duration of the frames may be 10-20 millisecond (ms), for example. Audio encoder 110 may be composed of convolutional, recurrent, attentional, pooling, or fully connected neural layers as well as any suitable nonlinearities and normalizations.

Vector quantizer 112 uses codebook 114 to quantize the embedding vectors. Codebook 114 includes codewords associated with/referenced by indices to access the codewords. Vector quantizer 112 quantizes the embedding vectors into codewords from the codebook that most closely match the embedding vectors, to produce indices that represent the codewords. For example, vector quantizer 112 may use techniques such as Residual Vector Quantization to select the codewords from codebook 114 from each layer to optimize a criterion reducing quantization error. In some implementations, audio encoder 110 may generate the quantized vectors (indices) directly without the need for a separate vector quantizer.

According to embodiments presented herein, vector quantizer corrector 116 performs vector quantization correction (VQC) on the indices to produce corrected indices. Embodiments directed to the VQC are described below in connection with FIGS. 3-5. Indices encoder 118 encodes the corrected indices into encoded data comprising a series of bits, for example. Indices encoder 118 populates transmit (TX) packets with the encoded data, and transmits the TX packets to receive side 104 through network 106 and/or stores the TX packets for later retrieval and use.

Receive side 104 includes a jitter buffer 122, an indices decoder 124, a vector de-quantizer 126 that employs a codebook 128, and an audio decoder 130. Receive side 104 obtains receive (RX) packets from network 106. Jitter buffer 122 tracks and orders the incoming packets, and determines when to process and play each packet. Jitter buffer 122 may also be used to detect packet losses. Indices decoder 124 recovers indices from the RX packets, and provides the indices to vector de-quantizer 126. Vector de-quantizer 126 uses codebook 128 (which includes a copy of codebook 114) to de-quantizes the indices to produce recovered embedding vectors. Audio decoder 130 decodes the embedding vectors to produce an output audio stream that replicates the input audio stream.

Techniques are provided for a generative artificial intelligence (AI) architecture built on the neural audio codec system 100 shown in FIG. 1. At the core of this architecture is a compact speech vector that has great potential for a wide range of speech AI and other applications. The proposed unified architecture offers a versatile solution applicable to various content, including, but not limited to, speech enhancement (such as background noise removal, de-reverberation, speech super-resolution, bandwidth extension, gain control, and beamforming), packet loss concealment (with or without forward error correction (FEC)), acoustic speech recognition (ASR), speech synthesis, also referred to as text-to-speech (TTS), voice cloning and morphing, speech-to-speech translation (S2ST), and audio-driven large language model (AdLLR).

Neural Audio Codec Training

Figure 2:
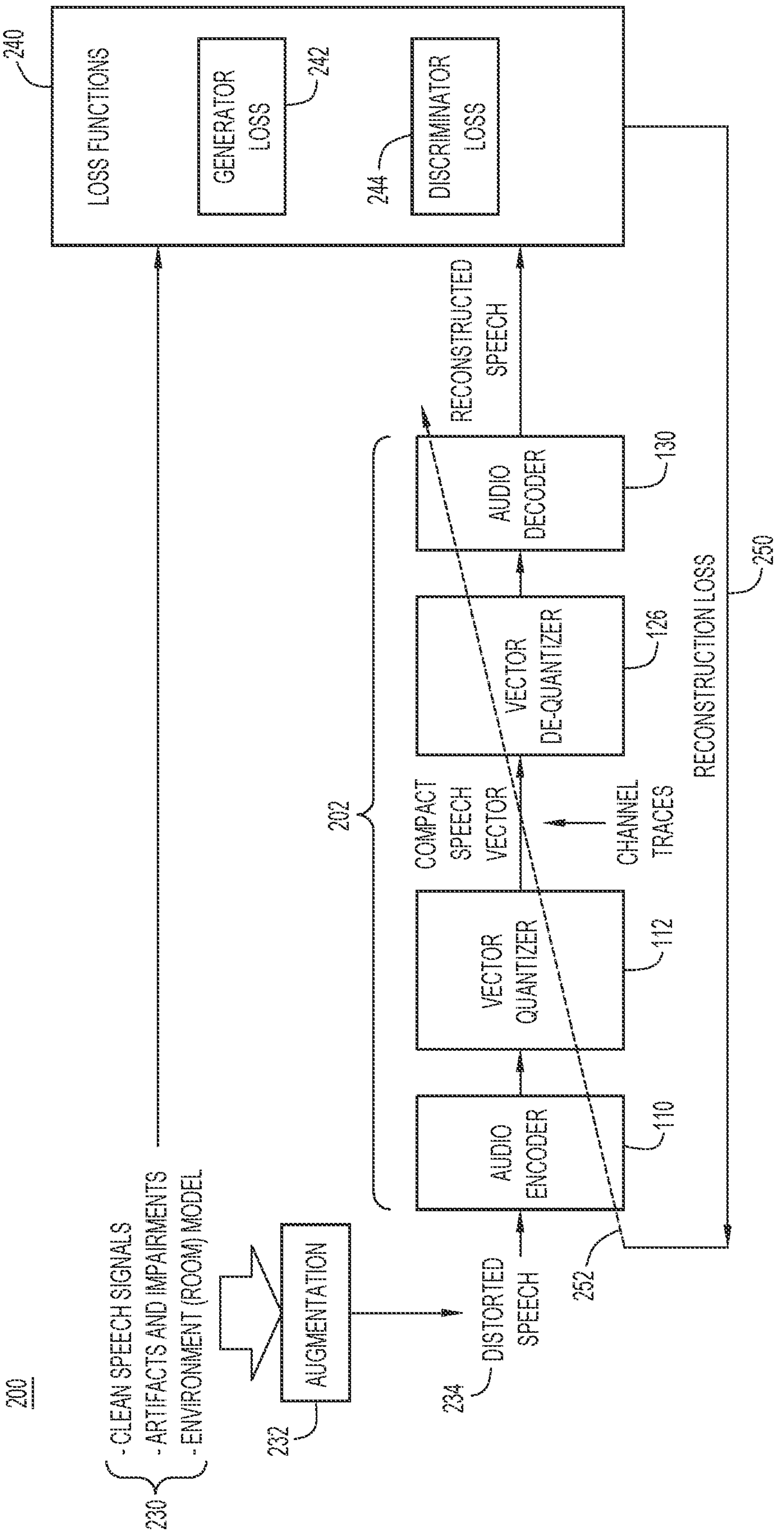
FIG. 2 shows an arrangement by which various components of the neural audio codec system are trained end-to-end using a corpus of speech and artifacts and impairments, according to an example embodiment.

FIG. 2 shows an arrangement 200 by which various components of neural audio codec system 100 are trained end-to-end using thousands of hours of speech and artifacts and impairments. Arrangement 200 includes audio encoder 110, vector quantizer 112 (which uses codebook 114, not shown), vector de-quantizer 126 (which uses codebook 128, not shown), and audio decoder 130 (collectively indicated by reference numeral 202), which may all use neural network models (or more generally machine learning-based models) for their operations. Thus, the training techniques described in connection with FIG. 2 train the neural network models of these components. Indices encoder 118 and indices decoder 124 may be included in the training arrangement. Vector quantizer corrector 116 is omitted from the training, and is configured post training.

To train the neural audio codec system 100, as shown at reference numeral 230, various artifacts and impairments are applied to the clean speech signals through an augmentation operation 232 to produce distorted speech 234. The artifacts and impairments may include background noise, reverberation, band limitation, packet loss, etc. In addition, an environment model, such as a room model, may be used to impact the clean speech signals. The distorted speech 234 is then input into the neural audio codec system 100 in its initially untrained state.

The training process involves applying loss functions 240 to the reconstructed speech that is output by audio decoder 130. Loss functions 240 may include a generative loss function 242 and an adversarial/discriminator loss function 244. Loss functions 240 output a reconstruction 250 that is used to adjust parameters of the neural network models used by audio encoder 110, vector quantizer 112, vector de-quantizer 126 and audio decoder 130, as shown at 252. Thus, the neural network models used by audio encoder 110, vector quantizer 112 and its codebook, vector de-quantizer 126 and its codebook, and audio decoder 130 may be trained in an end-to-end hybrid manner using a mix of reconstruction and adversarial losses.

As a result of this training, audio encoder 110 takes raw audio input and leverages a deep neural network to extract a comprehensive set of features that encapsulate intricate speech and background noise characteristics jointly or separately. The extracted speech features represent both the speech semantic as well as speech stationary attributes such as volume, pitch modulation, accent nuances, and more. This represents a departure from conventional audio codecs that rely on manually designed features, whereas in the embodiments presented herein, the neural audio codec systems learns and refines its feature extraction process from extensive and diverse datasets, resulting in a more versatile and generalized representation.

The output of audio encoder 110 materializes as a sequence of embedding vectors, with each embedding vector encapsulating a snapshot of audio attributes over a timeframe. Vector quantizer 112 further compresses the embedding vectors into compact/quantized speech vectors, i.e., codewords, using a residual vector quantization model. The codeword indices streams are ready for transmission or storage. At the receiving end, the audio decoder takes the compressed bitstream as input, reverses the quantization process, reconstructs the speech into time-domain waveforms.

The end-to-end training may result in a comprehensive and compact representation of clean speech. This is a data-driven compressed representation of speech, where the representation has a lower dimensionality that makes it easier to manipulate and utilize than if the speech were in its native domain. By "data-driven" it is meant that the representation of speech is developed or derived through ML-based training using real speech data, rather than a human conjuring the attributes for the representation. The data used to train the models may include a wide variety of samples of speech, languages, accents, different speakers, etc.

In the use case of speech enhancement, the compact speech vector represents "everything" needed to recover speech but discarding anything else related to artifacts or impairments. Thus, for speech enhancement applications, the neural audio codec system does not encode audio, but rather, encodes only speech, discarding the non-speech elements. In so doing, the neural audio codec system can achieve a more uniquely speech-related encoding, and that encoding is more compact because it does not express the other aspects that are included in the input audio. Training to encode speech is effectively training to reject everything else, and this can result in a stronger speech encoded foundation for any other transformation to or from speech.

Loss Functions for Training

Loss functions useful during training are now described. Reconstruction losses may be used to minimize the error between the clean signal, known as a target signal, x and an enhanced signal generated by the neural audio codec, denoted $\hat{x}$, which is denoised and dereverberated and/or with concealed packets/frames loss of its input signal y, noisy, reverberated audio signal and/or with lost packets/frames. One or more reconstruction losses may be used in the time domain or time-frequency domain.

A loss in the time domain may involve minimizing a distance between estimated clean $\hat{x}$ and the target signal x time domain:

$$\mathcal{L}_t = \sum_{n=1}^{N} |x[n] - \hat{x}[n]|,$$

where $\mathcal{L}_t$ is the L1 norm loss and N denotes to number of samples of $\hat{x}$ and x in the time domain, where L1 Norm is a sum of the magnitudes of the vectors in a space and is one way to measure distance between vectors (sum of absolute difference of components of the vectors). In some implementations, the L1 norm loss and/or the L2 norm loss may be used.

A weighted signal-to-distortion radio (weighted SDR) may be used, where the input signal y is represented as x with additive noise n: y=x+n, then SDR loss is defined as:

$$\mathcal{L}_{SDR}(x, \hat{x}) = -\frac{\langle x, \hat{x}\rangle}{\|x\|\|\hat{x}\|},$$

where the operator ⟨,⟩ represents the inner product and ‖, ‖ represents Euclidean norm. This loss is phase sensitive with the range [−1,1]. For noise only samples, to be more precise, a noise prediction term is added to define the final weighted SDR loss:

$$\mathcal{L}_{SDR}(x, n, \hat{n}) = \mathcal{L}_{SDR}(x, \hat{x}) + \mathcal{L}_{SDR}(n, \hat{n}),$$

where $\hat{n}=y-\hat{x}$ is estimated noise.

Multi-scale Short-Time Fourier Transform (MS-STFT) operates in the frequency domain using different window lengths. This approach of using various window lengths is inspired by the Heisenberg Uncertainty Principle, which shows that a larger window length gives greater frequency resolution but lower time resolution, and the opposite for a shorter window length. Therefore, the MS-STFT uses a range of window lengths to capture different features of the audio waveform.

The loss is defined as:

$$\mathcal{L}_{MSTFT} = \sum_{l=1}^{L}\sum_{k=1}^{K}\left|S^{w}[l, k] - \hat{S}^{w}[l, k]\right| + \alpha_{w}\sum_{l=1}^{L}\sum_{k=1}^{K}\sqrt{\left|\log(S^{w}[l, k]) - \log(\hat{S}^{w}[l, k])\right|^{2}},$$

where $S^w[l,k]$ is the energy of the spectrogram at frame l and frequency bin k and characterized by a window w, K is the number of frequency bins, L is the number of frames and $\alpha_w$ is a parameter to balance between L1 Norm and L2 Norm part of the loss, where the L2 Norm is the square root of the sum of the entries of a vector. The second part of the loss is computed using a log operator to compress the values. Generally, most of the energy content of speech signal is concentrated below 4 kHz. Therefore, the energy magnitude in lower frequency components is significantly higher than higher frequency components, with going to log domain, the magnitude of higher frequencies and lower frequencies get closer, thus more focus on higher frequency components compared to linear scale. A high-pass filter can be designed to improve performance for high-frequency content.

A Mean Power Spectrum (MPS) loss function aims to minimize the discrepancy between the mean power spectra of enhanced and clean audio signals in the logarithmic domain using L2 Norm.

The power spectrum of the signal is computed as below:

$$P(x) = \frac{1}{N}\sum_{n=0}^{N-1}|X_n|^2,$$

where P(x) is the mean power spectrum of signal x, X is FFT/STFT of signal x.

A logarithm may be applied to the mean power spectrum, such that the logarithmic power spectrum of a signal x is:

$$L(x) = 10\log_{10}(P(x) + \epsilon),$$

where ∈ is a small constant to prevent the logarithm of zero.

The MPS loss between the enhanced and clean signals can then be defined as the L2 Norm of the difference between their logarithmic power spectra:

$$\mathcal{L}oss(\hat{x}, x) = \sqrt{\sum(L(\hat{x}) - L(x))^2}.$$

Generative Adversarial Networks (GANs) comprise two main models: generator and discriminator. In the neural network codec system, the audio encoder, vector quantizer and audio decoder may employ GAN generator and discriminator models. As an example, two adversarial loss functions could be used in the neural audio codec system: Lease-squared adversarial loss functions and hinge loss functions.

Least square (LS) loss functions for discriminator and generator may be respectively defined as:

$$\mathcal{L}_{ADV}(D; G) = E_{(x,s)}\left[(D(x) - 1)^2 + D(G(y))^2\right],$$

$$\mathcal{L}_{ADV}(G; D) = E_{d}\left[D(G(y) - 1)^2\right].$$

For discriminator loss, $\mathcal{L}_{ADV}$(D; G), $E_{(,)}$ is the expectation operator, D(x), is the output of the discriminator for a real signal x, D(G(y)) is the discriminator output of enhanced (fake) signal and $\mathcal{L}_{ADV}$(G;D) is the generator loss.

Hinge loss for the discriminator and generator may be defined as:

$$\mathcal{L}_{ADV}(D; G) = E_{(x,y)}[\max(1 - D(x), 0) + \max(0, 1 + D(G(y)))],$$

$$\mathcal{L}_{ADV}(G; D) = E_{y}[\max(1 - D(G(y)), 0)].$$

Hinge loss may be preferred over least square loss because in the case of discriminator loss, hinge loss tries to maximize the distance between the real signal and fake signal while LS loss tries to score 1 when the input is a "real signal" and 0 when the input is "fake signal".

In addition to above-mentioned losses, feature matching may be used to minimize the difference between the intermediate features of each layer of real and generated signals when passed through the discriminator. Instead of solely relying on the final output of the discriminator, feature matching ensures that the generated samples have similar feature statistics to real samples at various levels of abstraction. This helps in stabilizing the training process of adversarial networks by providing smoother gradients. Feature matching loss may be defined as:

$$\mathcal{L}_{FM}(G;D) = E_{(x,y)}\left[\sum_{i=1}^{T}\frac{1}{N_i}\left\|D^i(x) - D^i(G(y))\right\|_1\right],$$

where $N_i$ is the number of layers in the discriminator D, and superscript i is used to design the layer number. Note that feature matching loss updates only generator parameters.

Several different discriminator models may be suitable for use in the training arrangement of FIG. 2, including: Multi-Scale Discriminator (MSD), Multi-Period Discriminator (MPD) and Multi-Scale Short-Time Fourier Transform (MS-STFT).

For a MSD, the discriminator is looking at the waveform at the different sampling rates. The waveform discriminators have the same network architecture but use different weights. Each network is composed of n number of strided 1-dimensional (1D) convolution blocks, an additional 1D convolution, and global average pooling to output a real-value score. A "leaky" rectifier linear unit (Leaky ReLu) may be used between the layers for the purpose of non-linearity of the network.

A MPD operates on the time-domain waveform and tries to capture implicit periodicity structure of the waveform. In an MPD discriminator, different periods of the waveform are considered. For each period, the same network architecture, with different weights, are used. The network consists of n strided two-dimensional (2D) convolution blocks, an additional convolution, and a global average pooling for outputting a scalar score. In the convolution block weight normalization may be used along with a Leaky ReLu as an activation function.

An MS-STFT discriminator, unlike the MSD and MPD, operates in the frequency domain using a Short-Time Fourier Transform (STFT). This discriminator enables the model to analyse the spectral content of the signal. The MS-STFT discriminator analyzes the "realness" of the signal at multiple time-frequency scales or resolutions. Having spectral content of the waveform in various resolutions, the model is able to analyze the "realness" of the waveform more profoundly. The MS-STFT discriminator may be composed of t equivalent networks that handle multi-scaled complex-valued STFTs with incremental window lengths and corresponding hop sizes. Each of these networks contains a 2D convolutional layer, with weight normalization applied, featuring a nxm kernel size and c number of channels, followed by a Leaky ReLu non-linear activation function. Subsequent 2D convolution layers have dilation rates in the temporal dimension and an output stride of j across the frequency axis. At the end we have dxd convolution with stride 1 followed by flatten layer to get the output scores.

Finally, the total loss of adversarial training may be defined as:

$$\mathcal{L} = \lambda_{FM}\mathcal{L}_{FM} + \lambda_{MSTFT}\mathcal{L}_{MSTFT} + \lambda_G\mathcal{L}_{ADV}(G;D) + \lambda_D\mathcal{L}_{ADV}(D;G) + \lambda_t\mathcal{L}_t + \lambda_{SDR}\mathcal{L}_{SDR},$$

where λ coefficients are used to give more weights to some losses compared to the other losses, $\mathcal{L}_{FM}$ is the feature matching loss. $\mathcal{L}_{MSTFT}$ is MS-STFT loss that can be replaced by $\mathcal{L}_{MSD}$ for MSD discriminator or $\mathcal{L}_{MPD}$ for MPD discriminator.

Vector Quantization Correction

As described above, audio encoder 110 and vector quantizer 112 are trained during the data driven training described above. Post training, at every fixed time interval, audio encoder 110 encodes an input audio stream into a sequence of embedding vectors. In turn, vector quantizer 112 quantizes the sequence of embedding vectors into a sequence of indices of codewords of codebook 114 to be transmitted to receive side 104. For example, vector quantizer 112 assigns the embedding vectors to indices/index clusters based on a distance computation to centroids of the clusters. The distance computation may be based on a negative dot product, for example.

Sometimes, vector quantizer 112 may assign "outlier" indices (also referred to as "quantization outliers" or simply "outliers") that are not correct. Without correction, the outliers cause audio distortion at the output of audio decoder 130, which a listener perceives as degraded audio. According to embodiments presented herein, to mitigate the occurrence of outliers, vector quantizer corrector 116 performs vector quantization correction (VQC) on the "original" sequence of indices that include the outliers, to produce a sequence of corrected indices. The VQC outputs the corrected sequence of indices that includes corrected outliers in place of the original sequence of indices with the outliers. Thus, the VQC substantially reduces or eliminates instances of the outliers transmitted to receive side 104, which improves the decoded audio quality at the receive side. Additionally, the VQC can improve the compression rate of the indices. The corrected outliers may further be used in subsequent neural network training.

At a high-level, the VQC considers a combination of (i) predetermined probabilities of transitions (referred to as "transition probabilities") between sequences of indices, and (ii) the above mentioned cluster distances. Consider an original sequence of indices generated by vector quantizer 112 that includes an outlier that is associated with a best cluster distance, but a low (and thus undesired) transition probability. In this case, the VQC selects a new/corrected index to replace the outlier based on the combination of (i) the transition probabilities of sequences of indices that pass through the outlier, and (ii) the distances to other cluster centroids. The VQC replaces the outlier with the corrected index. Rather than replace intermittent outliers of the original sequence of indices, the VQC replaces the original sequence of indices in its entirety with a corrected sequence of indices from which the outliers have been removed, and provides the same to indices encoder 118.

After VQC, indices encoder 118 may use an entropy encoding technique (e.g., Huffman coding) to encode the corrected sequence of indices into encoded data including a series of bits using a set of predefined dictionaries, for example. Indices encoder 118 transmits, to receive side 104, a TX packet including the encoded data. Receive side 104 receives the packet. Indices decoder 124 recovers the corrected sequence of indices from the packet using the predefined dictionaries. Vector de-quantizer 126 converts the corrected sequence of indices into embedding vectors. Audio decoder 130 converts the embedding vectors into audio data having improved quality.

The VQC is now described in detail. The VQC proposes a fixed number of sequences of indices (also called "sequences of candidate indices" and simply "candidate sequences") for a potential replacement of the original sequence of indices (also referred to as the "original sequence"). To achieve this, the VQC searches for alternative indices, representative of different cluster centroids, that are at relatively close distances from the embedding vectors.

In the search, the VQC considers transition probabilities between successive indices in addition to distances between the embedding vectors produced by the encoder and cluster centroids represented by the indices. That is, the VQC considers a transition probability from each index to each next index. The addition of transition probability eliminates improbable indices, which are treated as outlying values in the original sequence of indices.

The transition probabilities may be precomputed post training but prior to the VQC, using a transition probability computation process. The transition probability computation process applies/runs extensive (e.g., many hours of audio data) through audio encoder 110 and vector quantizer 112 as trained, and records the sequence of indices generated by the vector quantizer responsive to the audio data. The transition probability computation process performs the following operations on the recorded data to produce statistics for the transition probabilities:

a. Count a total number of indices generated by vector quantizer 112 across the audio data.
b. Identify all of the different transitions combinations that occur between successive indices, and count occurrences of each of the different transition combinations.
c. Compute the transition probabilities for the different transition combinations based on the total number of indices and the number of occurrences of each of the different transition combinations, e.g., for each different transition combination. For example, for each different transition combination, compute a ratio of the number of occurrences of the different transition combination and the total number of indices.

Figure 3:
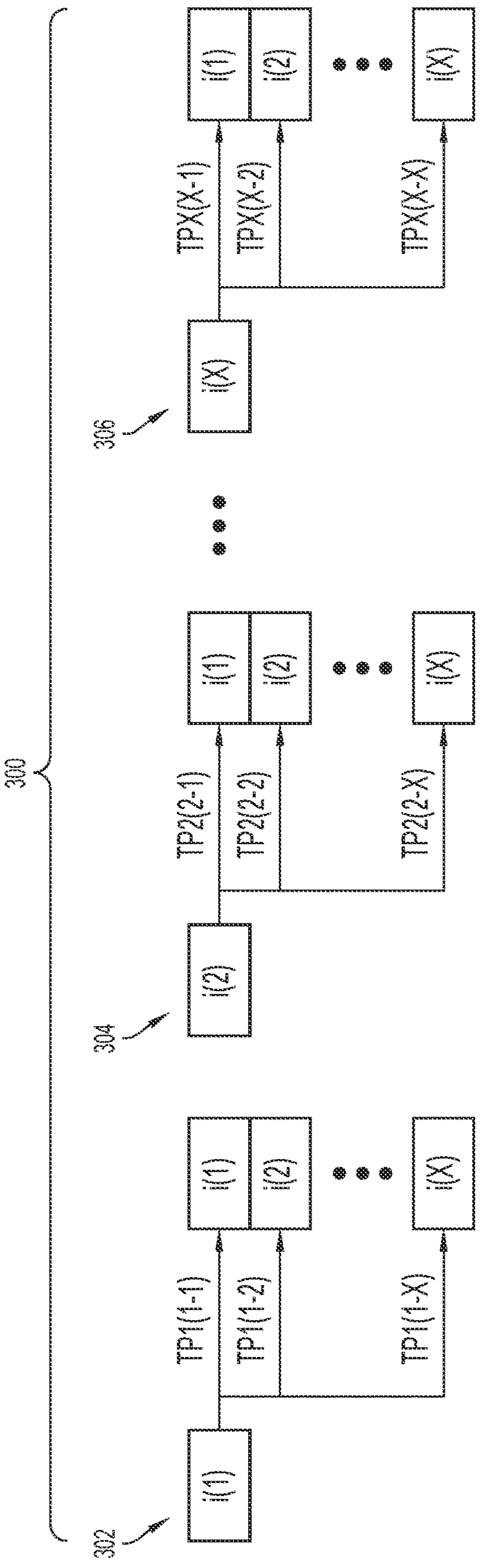
FIG. 3 is a diagram of a data structure that records transition probabilities for transitions between indices of a codebook, according to an example embodiment.

FIG. 3 is a diagram representing an example data store 300 that records transition probabilities produced by the transition probability computation process. The example assumes a codebook with X entries/codewords accessed/indexed by X indices i(1), i(2) . . . i(X). Data store 300 shows transition probabilities (TP) from each index to every other possible index. For example, data store 300 includes transition probabilities 302 (TP1) from index i(1) to each of indices i(1) to i(X), transition probabilities 304 (TP2) from index i(2) to each of indices i(1) to i(M), and transition probabilities 306 (TPM) from index i(X) to each of indices i(1) to i(X). Therefore, data store 300 records $X^2$ transition probabilities.

An example algorithm performed by the VQC using the transition probabilities and distances to clusters is now described. In the ensuing description, the term "symbol" is synonymous with "index" and an "embedding vector" may be referred to as an "embedding." Also, an "embedding cluster centroid" is represented by a "codeword." The example assumes a packet length N, defines a sequence of embedding vectors $E_t \in \mathbb{R}^d$ and corresponding symbols $S_t \in \{1, \ldots, X\}$, where t (e.g. t=1, . . . , N) denotes a time index (and correspondingly positions of indices) of the sequence, and defines $C_j \in \mathbb{R}^d$ (j=1, . . . , X) as embedding cluster centroids of dimension d. Assuming $x_t=[i_1, \ldots, i_t]$ is a sequence of symbol candidates for replacement at time t, a cost function may be defined as:

$$L(x_t) = \sum_{j=1}^{t} \alpha D(E_j, C_{i_j}) - \sum_{j=1}^{t-1} \log P_{i_{j+1}|i_j},$$

where α is a predefined parameter, D $(E_j, C_{i_j})$ is a distance between embeddings from audio encoder 110 to symbol clusters (i.e., codewords) of vector quantizer 112, and $P_{i_{j+1}|i_j}$, is the conditional probability of transitioning to a current symbol, given the previous symbol (similarly, transitioning from a current symbol to a next symbol). In the example, the cost function (also referred to as a "transition cost" and a "cost") represents a difference between a first function of a transition probability of a transition (e.g., $\Sigma_{j=1}^{t-1} \log P_{i_{j+1}|i_j}$) and a second function of a distance between a codeword and a corresponding input vector (e.g., $\Sigma_{j=1}^{t} \alpha D(E_j, C_{i_j})$. Other combined cost functions are possible, provided they factor in both transition probability and distance.

Finding the best sequence of candidates ($x_t$*) is achieved by minimizing the cost function:

$$x_t^* = \underset{x_t}{\operatorname{argmin}} L(x_t).$$

Figure 4:
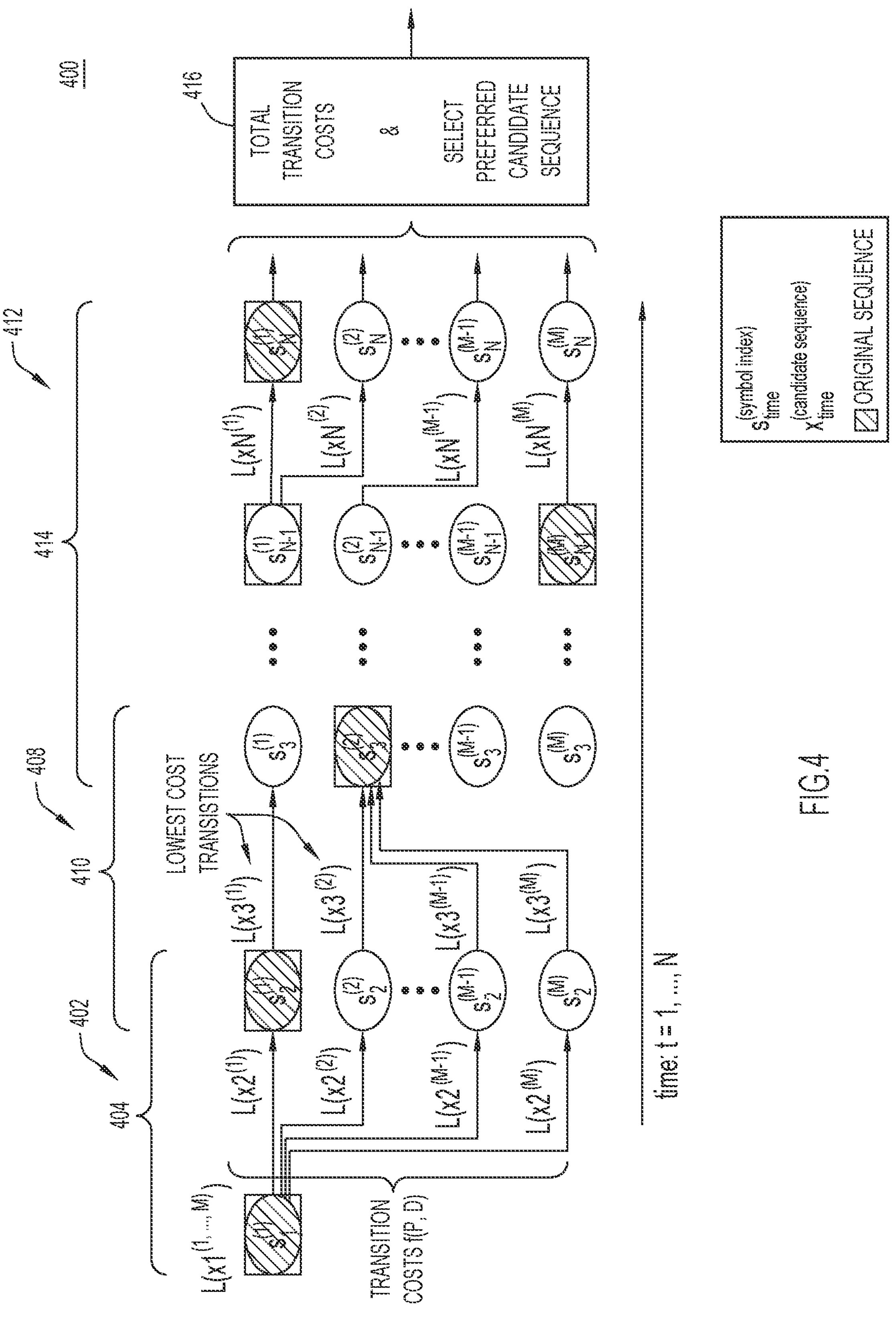
FIG. 4 is an illustration of a trellis structure generated by a vector quantization correction (VQC) process to construct and evaluate multiple symbol sequences of candidate symbols, according to an example embodiment.

FIG. 4 is an illustration of an example trellis structure 400 constructed by the VQC to generate multiple sequences of candidate symbols (i.e., candidate sequences). The example assumes that the VQC has access to an original sequence of symbols that is N symbols long, generated by vector quantizer 112. The VQC uses trellis structure 400 to concurrently construct and evaluate the candidate sequences, which compete against each other on the basis of their costs. The VQC evaluates the original sequence as one of the candidate sequences. The VQC finally selects a best candidate sequence among the candidate sequences, as a replacement for the original sequence. Use of the trellis structure for generating and evaluating candidate sequences using transition probabilities and distances is presented herein by way of example, only. It is understood that other approaches may be used for generating and evaluating the candidate sequences, provided transition probabilities and distances are considered.

At a high-level, step-by-step, at each time t=1, . . . , N, the VQC proposes M sequences of candidate symbols (i.e., M candidate sequences) leading from the first to the current symbol $x_t^{(1)}, \ldots, x_t^{(M)}$ with associated cost functions (or transition costs) $L(x_t^{(1)}), \ldots, L(x_t^{(M)})$. Even when a symbol was a top M candidate in a previous step, that symbol is not guaranteed to be included in one of the winning sequences after the next step. When the VQC reaches the final symbol $S_N$ in a packet, it replaces the original symbol sequence with a new corrected sequence. By then, the algorithm has obtained M candidate sequences that are each N symbols long, from which a candidate sequence having a lowest cost function is selected as a replacement for the original sequence.

As shown in FIG. 4, trellis structure 400 includes M rows of candidate symbols (represented by nodes of the trellis structure). Each row is N symbols across corresponding to respective ones of N embedding vectors (i.e., there are N columns to the trellis structure). Edges connecting the nodes represent transitions between successive ones of the candidate symbols. The columns of trellis structure 400 represent successive time steps or symbol positions. Each column presents the same M symbols of the codebook as candidate symbols. In FIG. 4, the original sequence includes symbols represented as connected squares. Constructing and evaluating the candidate sequences using the trellis structure proceeds in the following manner.

At 402, the VQC constructs a first stage 404 of trellis structure 400 that starts M candidate sequences. Starting with the first symbol $S_t^{(1)}$ for time t=1, the VQC computes and records individual costs of transitions (referred to as "test transitions") from the first symbol to all possible next symbols (also referred to as "candidate next symbols") available in the codebook. As shown, the VQC computes individual costs $L(x_2^{(1)})$, $L(x_2^{(2)})$, and so on, for test transitions from the first symbol to candidate next symbols $S_2^{(1)}$, $S_2^{(2)}$, and so on. The transition cost L for a given test transition leading from a symbol to a candidate next symbol is a function of the transition probability for the given test transition accessed from data store 300 and the distance between the codeword indexed by the candidate next symbol and the embedding corresponding to the time position of the candidate next symbol (e.g., in this case, time position t=2). The distance is available because it was previously computed by vector quantizer 112 when the vector quantizer computed all such distances during vector quantization of the embeddings into the original sequence.

At 408, the VQC constructs a second stage 410 of trellis structure 400. To do this, the VQC repeats the process described above separately for each symbol $S_2^{(1)}$, $S_2^{(2)}$, and so on, of the second column. For example, the VQC computes individual costs for M test transitions (i) from symbol $S_2^{(1)}$ to candidate next symbols $S_3^{(1)}$, $S_3^{(2)}$, and so on, (ii) from $S_2^{(2)}$ to candidate next symbols $S_3^{(1)}$, $S_3^{(2)}$, and so on. Next, for each symbol $S_2^{(1)}$, $S_2^{(2)}$, and so on, of the second column, the VQC selects (and records) the lowest cost test transition from that symbol to the candidate next symbol, and prunes all other transitions/paths. As shown in FIG. 4, this leaves only lowest cost transitions, e.g., from $S_2^{(1)}$ to $S_3^{(1)}$, from $S_2^{(2)}$ to $S_3^{(2)}$, . . . , and from both $S_2^{(M-1)}$ and $S_2^{(M)}$ to $S_3^{(2)}$, and all of their associated costs. Any symbols at time t=3 with no incoming transitions are pruned.

At 412, the VQC repeats operation 408 for subsequent time steps until time t=N to construct and evaluate subsequent stages 414 of the trellis structure, which produces M candidate sequences for final evaluation. Each candidate sequences is associated with a sequence of individual transition costs.

At 416, the VQC totals the individual transition costs for each of the M candidate sequences into an individual total transition cost for each of the M candidate sequences, to produce M individual total transition costs for the M candidate sequences. The VQC selects, as a replacement sequence for the original sequence, the candidate sequence among the M candidate sequences having a lowest individual transition cost. The VQC provides the replacement sequence (referred to above as the "corrected indices") to indices encoder 118 in place of the original sequence. In alterative embodiments, the best sequence of symbols can be obtained using one or more of the Viterbi algorithm and a beam search.

The VQC may be utilized in neural audio coding systems working in real-time (online) and offline, where a long sequence of symbols could be used instead of packets with a predefined length.

Figure 5:
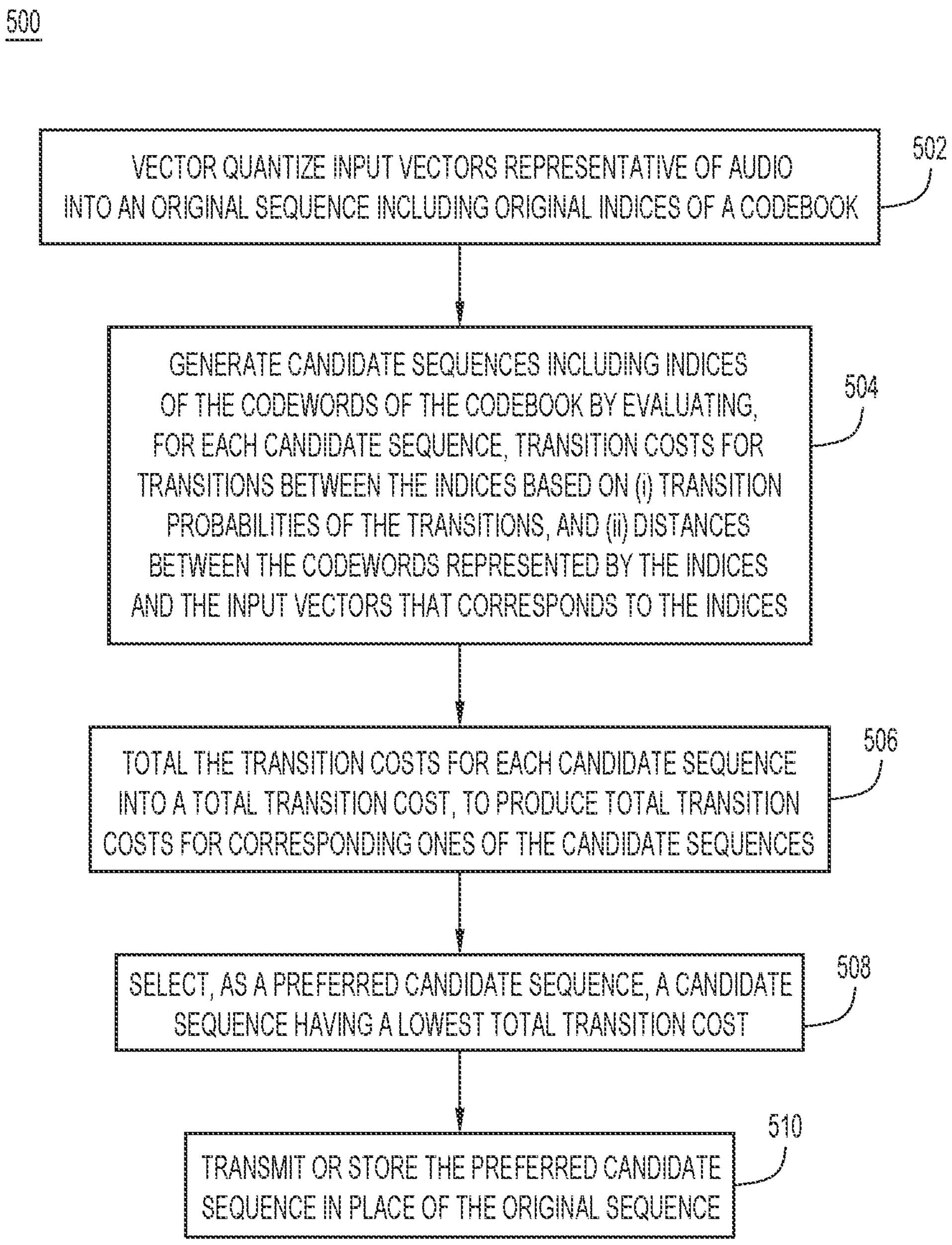
FIG. 5 is a flowchart of a method of using the VQC process to correct vector quantization errors, according to an example embodiment.

FIG. 5 is a flowchart of an example method 500 of using the VQC.

At 502, vector quantizer 112 vector quantizes a sequence of input vectors (e.g., embedding vectors) representative of audio into an original sequence of original indices (referred to as an "original sequence") of codewords of a codebook that are closest to the input vectors. The original indices have time/index positions that correspond to respective ones of the input vectors.

At 504, the VQC generates candidate sequences including candidate indices (referred to simply as "indices" below) of the codewords of the codebook by evaluating, for each candidate sequence, transition costs for transitions between the indices based on (i) transition probabilities of the transitions, and (ii) distances between the codewords represented by the indices and the input vectors that corresponds to the indices. More specifically, the VQC evaluates, for each candidate sequence, transition costs for transitions between each candidate index (referred to simply as "each index" below) and each candidate next index (referred to simply as "next index" below) (for that candidate sequence) based on (i) transition probabilities of the transitions, and (ii) distances between codewords represented by each next index and an input vector that corresponds to each next index. In an example, the candidate sequences may include the original sequences.

The VQC accesses the transition probabilities from a datastore of predetermined transition probabilities of the transitions from each index in the codebook to all indices of the codebook.

The VQC may generate the candidate sequence incrementally time step-by-time step (or index position-by-index position) and evaluate transition costs at each increment. For example, the VQC determines, time step-by-time step across all time steps/indices of the original sequence, each (candidate) next index for each (candidate) index (i.e., the VQC determines the transition from each index to each next index). To do this, the VQC computes next index transition costs for test transitions from each index to all possible next indices (i.e., candidate next indices) for the codewords available in the codebook. Then, the VQC selects, as each next index, a possible next index associated with a lowest next index transition cost. All other test transitions are pruned. In an example, the VQC computes each transition cost as a difference between a first function of a transition probability of a transition between successive indices and a second function of a distance between a codeword represented by one of the indices and a corresponding input vector. In an example, the VQC constructs, incrementally over time, a trellis structure of the indices and the transitions between the indices such that paths through the trellis structure represent the candidate sequences.

At 506, the VQC sums or totals the transition costs for each candidate sequence into a total transition cost, to produce total transition costs for corresponding ones of the candidate sequences.

At 508, the VQC selects, as the preferred candidate sequence, a candidate sequence of the candidate sequences having a lowest total transition cost.

Operations 506 and 508 collectively represent determining the preferred candidate sequence of the candidate sequences to replace the original sequence based on the transition costs for each candidate sequence.

At 510, the VQC provides or transmits the preferred candidate sequence in place of the original sequence. The corrected sequences may be encoded and transmitted, or they may be stored for later retrieval and decoding.

Computing Device

Figure 6:
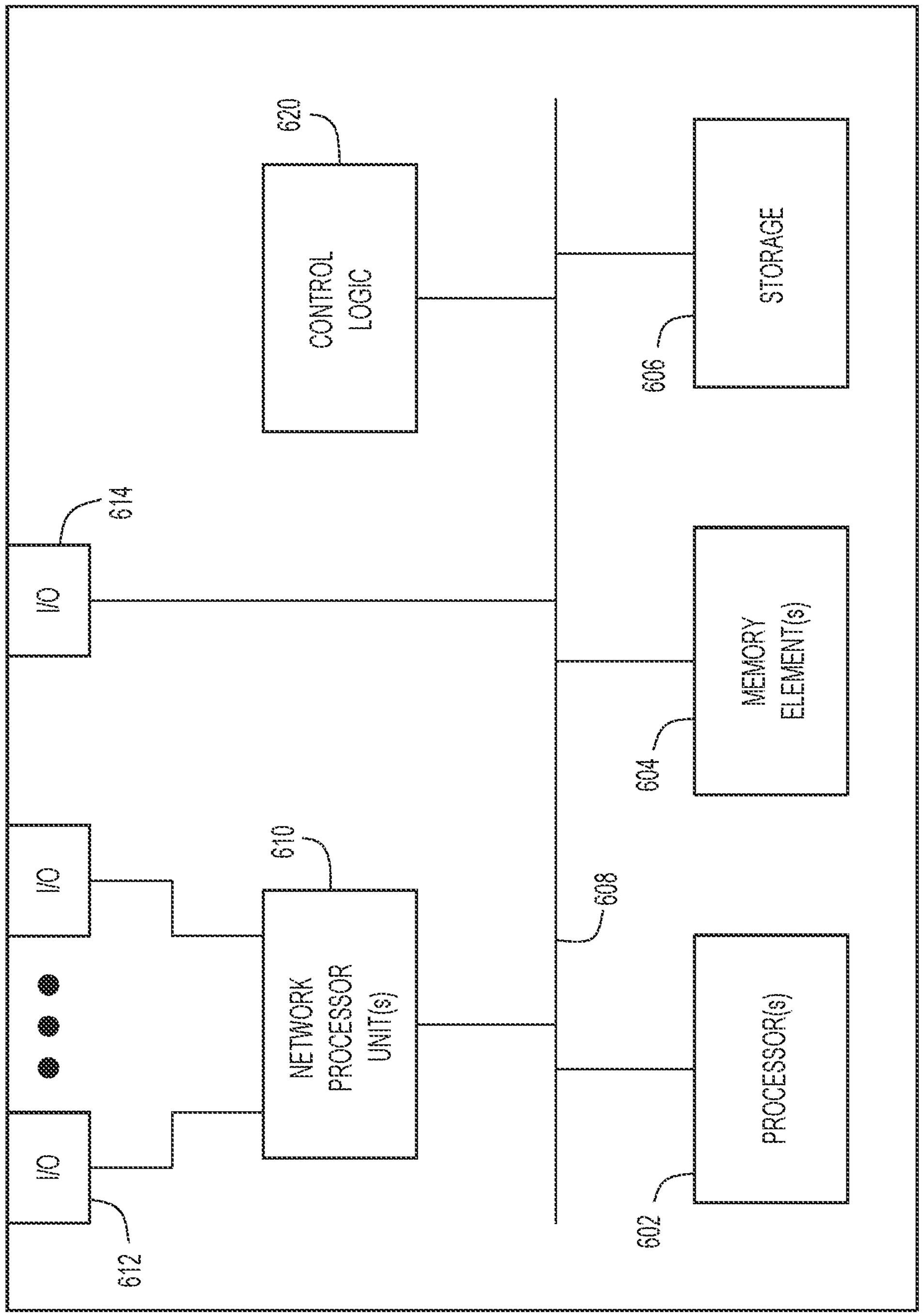
FIG. 6 illustrates a hardware block diagram of a computing device that may perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. For example, computing device may represent each of the components of neural audio codec system 100 individually and/or collectively.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., TI lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: vector quantizing input vectors representative of audio into an original sequence including original indices of codewords of a codebook; generating candidate sequences including indices of the codewords by evaluating, for each candidate sequence, transition costs for transitions between the indices based on (i) transition probabilities of the transitions, and (ii) distances between the codewords represented by the indices and the input vectors that correspond to the indices; determining a preferred candidate sequence of the candidate sequences to replace the original sequence based on the transition costs for each candidate sequence; and transmitting or storing the preferred candidate sequence in place of the original sequence.

In some aspects, the techniques described herein relate to a method, further including, prior to transmitting: totaling the transition costs for each candidate sequence into a total transition cost, to produce total transition costs for corresponding ones of the candidate sequences; and selecting, as the preferred candidate sequence, a candidate sequence of the candidate sequences having a lowest total transition cost.

In some aspects, the techniques described herein relate to a method, wherein evaluating includes evaluating, for each candidate sequence, the transition costs for the transitions between each index and each next index based on the transition probabilities of the transitions, and the distances between the codewords represented by each next index and an input vector that corresponds to each next index.

In some aspects, the techniques described herein relate to a method, wherein generating further includes, for each candidate sequence, determining each next index for each index by: computing next index transition costs for test transitions from each index to possible next indices for the codewords available in the codebook; and selecting as each next index a possible next index associated with a lowest next index transition cost.

In some aspects, the techniques described herein relate to a method, wherein: computing includes computing the next index transition costs based on test transition probabilities of the test transitions that lead from each index to each of the possible next indices and the distances between the codewords represented by the possible next indices and corresponding input vector.

In some aspects, the techniques described herein relate to a method, wherein: accessing the transition probabilities from a datastore of predetermined transition probabilities of the transitions from each index of the codewords in the codebook to the indices of all other codewords of the codebook.

In some aspects, the techniques described herein relate to a method, where evaluating each transition cost includes computing a difference between a first function of a transition probability of a transition and a second function of a distance between a codeword and a corresponding input vector.

In some aspects, the techniques described herein relate to a method, wherein: the original sequence includes N indices; the codebook includes M codewords; and generating includes generating M candidate sequences of N indices.

In some aspects, the techniques described herein relate to a method, wherein evaluating includes evaluating the original sequence as one of the candidate sequences.

In some aspects, the techniques described herein relate to a method, wherein generating includes generating the candidate sequences incrementally index position-by-index position and performing evaluating at each index position.

In some aspects, the techniques described herein relate to a method, wherein generating by evaluating includes constructing, incrementally over time, a trellis structure of the indices and the transitions between the indices such that paths through the trellis structure represent the candidate sequences.

In some aspects, the techniques described herein relate to an apparatus including: a network input/output interface to communicate with a network; and a processor coupled to the network input/output interface and configured to perform: vector quantizing input vectors representative of audio into an original sequence including original indices of codewords of a codebook; generating candidate sequences including indices of the codewords by evaluating, for each candidate sequence, transition costs for transitions between the indices based on (i) transition probabilities of the transitions, and (ii) distances between the codewords represented by the indices and the input vectors that correspond to the indices; determining a preferred candidate sequence of the candidate sequences to replace the original sequence based on the transition costs for each candidate sequence; and transmitting or storing the preferred candidate sequence in place of the original sequence.

In some aspects, the techniques described herein relate to an apparatus, wherein the processor is further configured to perform, prior to transmitting: totaling the transition costs for each candidate sequence into a total transition cost, to produce total transition costs for corresponding ones of the candidate sequences; and selecting, as the preferred candidate sequence, a candidate sequence of the candidate sequences having a lowest total transition cost.

In some aspects, the techniques described herein relate to an apparatus, wherein the processor is further configured to perform evaluating by evaluating, for each candidate sequence, the transition costs for the transitions between each index and each next index based on the transition probabilities of the transitions, and the distances between the codewords represented by each next index and an input vector that corresponds to each next index.

In some aspects, the techniques described herein relate to an apparatus, wherein the processor is further configured to perform generating by, for each candidate sequence, determining each next index for each index by: computing next index transition costs for test transitions from each index to possible next indices for the codewords available in the codebook; and selecting as each next index a possible next index associated with a lowest next index transition cost.

In some aspects, the techniques described herein relate to an apparatus, wherein: the processor is further configured to perform computing by computing the next index transition costs based on test transition probabilities of the test transitions that lead from each index to each of the possible next indices and the distances between the codewords represented by the possible next indices and corresponding input vector.

In some aspects, the techniques described herein relate to an apparatus, wherein the processor is further configured to perform: accessing the transition probabilities from a datastore of predetermined transition probabilities of the transitions from each index of the codewords in the codebook to the indices of all other codewords of the codebook.

In some aspects, the techniques described herein relate to a non-transitory computer medium encoded with instructions that, when executed by a processor, cause the processor to perform: vector quantizing input vectors representative of audio into an original sequence including original indices of codewords of a codebook; generating candidate sequences including indices of the codewords by evaluating, for each candidate sequence, transition costs for transitions between the indices based on (i) transition probabilities of the transitions, and (ii) distances between the codewords represented by the indices and the input vectors that correspond to the indices; determining a preferred candidate sequence of the candidate sequences to replace the original sequence based on the transition costs for each candidate sequence; and transmitting or storing the preferred candidate sequence in place of the original sequence.

In some aspects, the techniques described herein relate to a non-transitory computer medium, further including instructions to cause the processor to perform, prior to transmitting: totaling the transition costs for each candidate sequence into a total transition cost, to produce total transition costs for corresponding ones of the candidate sequences; and selecting, as the preferred candidate sequence, a candidate sequence of the candidate sequences having a lowest total transition cost.

In some aspects, the techniques described herein relate to a non-transitory computer medium, wherein the instructions to cause the processor to perform evaluating include instructions to cause the processor to perform evaluating, for each candidate sequence, the transition costs for the transitions between each index and each next index based on the transition probabilities of the transitions, and the distances between the codewords represented by each next index and an input vector that corresponds to each next index.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

vector quantizing input vectors representative of audio into an original sequence including original indices of codewords of a codebook;

generating candidate sequences including indices of the codewords and that have respective starting transitions from an initial index of the original sequence to respective ones of all possible indices, wherein generating includes evaluating, for each candidate sequence, transition costs for transitions between the indices based on linear combinations of (i) transition probabilities of the transitions, and (ii) distances between the codewords represented by the indices and the input vectors that correspond to the indices;

summing the transition costs for each candidate sequence into a total transition cost, to produce total transition costs for corresponding ones of the candidate sequences;

selecting a preferred candidate sequence of the candidate sequences that has a lowest total transition cost; and transmitting or storing the preferred candidate sequence in place of the original sequence.

2. The method of claim 1, wherein:

each linear combination includes subtracting a transition probability from a corresponding distance.

3. The method of claim 1, wherein evaluating includes evaluating, for each candidate sequence, the transition costs for the transitions between each index and each next index based on the transition probabilities of the transitions, and the distances between the codewords represented by each next index and an input vector that corresponds to each next index.

4. The method of claim 3, wherein generating further comprises, for each candidate sequence, determining each next index for each index by:

computing next index transition costs for test transitions from each index to possible next indices for the codewords available in the codebook; and selecting as each next index a possible next index associated with a lowest next index transition cost.

5. The method of claim 4, wherein:

computing includes computing the next index transition costs based on test transition probabilities of the test transitions that lead from each index to each of the possible next indices and the distances between the codewords represented by the possible next indices and corresponding input vector.

6. The method of claim 1, wherein:

accessing the transition probabilities from a datastore of predetermined transition probabilities of the transitions from each index of the codewords in the codebook to the indices of all other codewords of the codebook.

7. The method of claim 1, where evaluating each transition cost includes computing a difference between a first function of a transition probability of a transition and a second function of a distance between a codeword and a corresponding input vector.

8. The method of claim 1, wherein:

the original sequence includes N indices;

the codebook includes M codewords; and generating includes generating M candidate sequences of N indices.

9. The method of claim 1, wherein evaluating includes evaluating the original sequence as one of the candidate sequences.

10. The method of claim 1, wherein generating includes generating the candidate sequences incrementally index position-by-index position and performing evaluating at each index position.

11. The method of claim 1, wherein generating by evaluating includes constructing, incrementally over time, a trellis structure of the indices and the transitions between the indices such that paths through the trellis structure represent the candidate sequences.

12. An apparatus comprising:

a network input/output interface to communicate with a network; and a processor coupled to the network input/output interface and configured to perform:

vector quantizing input vectors representative of audio into an original sequence including original indices of codewords of a codebook;

generating candidate sequences including indices of the codewords and that have respective starting transitions from an initial index of the original sequence to respective ones of all possible indices, wherein generating includes evaluating, for each candidate sequence, transition costs for transitions between the indices based on a linear combination of (i) transition probabilities of the transitions, and (ii) distances between the codewords represented by the indices and the input vectors that correspond to the indices;

summing the transition costs for each candidate sequence into a total transition cost, to produce total transition costs for corresponding ones of the candidate sequences;

selecting a preferred candidate sequence of the candidate sequences that has a lowest total transition cost; and transmitting or storing the preferred candidate sequence in place of the original sequence.

13. The apparatus of claim 12, wherein:

each linear combination includes subtracting a transition probability from a corresponding distance.

14. The apparatus of claim 12, wherein the processor is further configured to perform evaluating by evaluating, for each candidate sequence, the transition costs for the transitions between each index and each next index based on the transition probabilities of the transitions, and the distances between the codewords represented by each next index and an input vector that corresponds to each next index.

15. The apparatus of claim 14, wherein the processor is further configured to perform generating by, for each candidate sequence, determining each next index for each index by:

computing next index transition costs for test transitions from each index to possible next indices for the codewords available in the codebook; and selecting as each next index a possible next index associated with a lowest next index transition cost.

16. The apparatus of claim 15, wherein:

the processor is further configured to perform computing by computing the next index transition costs based on test transition probabilities of the test transitions that lead from each index to each of the possible next indices and the distances between the codewords represented by the possible next indices and corresponding input vector.

17. The apparatus of claim 12, wherein the processor is further configured to perform:

accessing the transition probabilities from a datastore of predetermined transition probabilities of the transitions from each index of the codewords in the codebook to the indices of all other codewords of the codebook.

18. A non-transitory computer medium encoded with instructions that, when executed by a processor, cause the processor to perform operations including:

vector quantizing input vectors representative of audio into an original sequence including original indices of codewords of a codebook;

generating candidate sequences including indices of the codewords and that have respective starting transitions from an initial index of the original sequence to respective ones of all possible indices, wherein generating includes evaluating, for each candidate sequence, transition costs for transitions between the indices based on a linear combination of (i) transition probabilities of the transitions, and (ii) distances between the codewords represented by the indices and the input vectors that correspond to the indices;

summing the transition costs for each candidate sequence into a total transition cost, to produce total transition costs for corresponding ones of the candidate sequences;

selecting a preferred candidate sequence of the candidate sequences that has a lowest total transition cost; and transmitting or storing the preferred candidate sequence in place of the original sequence.

19. The non-transitory computer medium of claim 18, wherein:

each linear combination includes subtracting a transition probability from a corresponding distance.

20. The non-transitory computer medium of claim 18, wherein the instructions to cause the processor to perform evaluating include instructions to cause the processor to perform evaluating, for each candidate sequence, the transition costs for the transitions between each index and each next index based on the transition probabilities of the transitions, and the distances between the codewords represented by each next index and an input vector that corresponds to each next index.

* * * * *